United States Patent
Silvernail et al.

(10) Patent No.: US 9,090,857 B2
(45) Date of Patent: Jul. 28, 2015

(54) SOLIDIFICATION MATRICES USING PHOSPHONOCARBOXYLIC ACID COPOLYMERS AND PHOSPHONOPOLYACRYLIC ACID HOMOPOLYMERS

(71) Applicant: Ecolab USA Inc., St. Paul, MN (US)

(72) Inventors: Carter Martin Silvernail, Burnsville, MN (US); Kerrie E. Walters, Minneapolis, MN (US); Brenda Lynn Tjelta, St. Paul, MN (US); Lisa Maureen Sanders, Eagan, MN (US); Michael Edward Besse, Golden Valley, MN (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 14/282,800

(22) Filed: May 20, 2014

(65) Prior Publication Data

US 2014/0256611 A1 Sep. 11, 2014

Related U.S. Application Data

(63) Continuation of application No. 13/603,623, filed on Sep. 5, 2012, now Pat. No. 8,772,221, which is a continuation-in-part of application No. 13/372,560, filed on Feb. 14, 2012, now Pat. No. 8,389,464, which is a continuation of application No. 12/832,201, filed on Jul. 8, 2010, now Pat. No. 8,138,138, which is a continuation-in-part of application No. 11/969,385, filed on Jan. 4, 2008, now Pat. No. 7,763,576.

(51) Int. Cl.
| | |
|---|---|
| C11D 3/37 | (2006.01) |
| C11D 3/10 | (2006.01) |
| C11D 17/00 | (2006.01) |
| C11D 3/04 | (2006.01) |
| C11D 3/06 | (2006.01) |
| C08L 43/02 | (2006.01) |
| C08L 33/02 | (2006.01) |

(52) U.S. Cl.
CPC ............... *C11D 3/3784* (2013.01); *C08L 43/02* (2013.01); *C11D 3/046* (2013.01); *C11D 3/06* (2013.01); *C11D 3/10* (2013.01); *C11D 3/3761* (2013.01); *C11D 17/0052* (2013.01); *C11D 17/0065* (2013.01); *C11D 17/0073* (2013.01); *C08L 33/02* (2013.01)

(58) Field of Classification Search
CPC .................................................. C11D 3/3784
USPC .................. 510/451, 446; 252/160
See application file for complete search history.

(56) References Cited

U.S. PATENT DOCUMENTS

| | | | |
|---|---|---|---|
| 3,048,548 A | 8/1962 | Martin et al. | |
| 3,334,147 A | 8/1967 | Brunelle | |
| 3,444,242 A | 5/1969 | Rue | |
| 4,595,520 A * | 6/1986 | Heile et al. ................ | 510/380 |
| 4,618,914 A | 10/1986 | Sato et al. | |
| 4,680,134 A | 7/1987 | Heile et al. | |
| 4,689,167 A | 8/1987 | Collins et al. | |
| 4,711,725 A | 12/1987 | Amick et al. | |
| RE32,763 E | 10/1988 | Fernholtz et al. | |
| RE32,818 E | 1/1989 | Fernholz et al. | |
| 4,820,440 A | 4/1989 | Hemm et al. | |
| 4,830,733 A | 5/1989 | Nagji et al. | |
| 4,906,397 A | 3/1990 | Leighton et al. | |
| 4,971,714 A | 11/1990 | Lokkesmoe et al. | |
| 5,009,804 A | 4/1991 | Clayton et al. | |
| 5,061,396 A | 10/1991 | Lovine et al. | |
| 5,152,910 A | 10/1992 | Savio et al. | |
| 5,256,327 A | 10/1993 | Allen et al. | |
| 5,340,501 A | 8/1994 | Steindorf | |
| 5,482,647 A | 1/1996 | Bolkan et al. | |
| 5,646,103 A | 7/1997 | Kottwitz et al. | |
| 5,719,111 A * | 2/1998 | van den Brom et al. ...... | 510/224 |
| 5,759,976 A | 6/1998 | Roach et al. | |
| 5,866,012 A | 2/1999 | Austin et al. | |

(Continued)

FOREIGN PATENT DOCUMENTS

| | | |
|---|---|---|
| JP | 2000199178 | 7/2000 |
| JP | 2004204016 | 7/2004 |

OTHER PUBLICATIONS

Ecolab USA Inc., PCT/US2013/078513 filed Dec. 31, 2013, "The International Search Report and The Written Opinion of the International Searching Authority, or The Declaration", mail date Apr. 23, 2014.

(Continued)

*Primary Examiner* — Nicole M Buie-Hatcher
*Assistant Examiner* — M. Reza Asdjodi
(74) *Attorney, Agent, or Firm* — McKee, Voorhees & Sease, PLC

(57) ABSTRACT

Stability enhancement agents for use in a solidification matrices and solid detergent compositions are described. Stability enhancement is provided by a hydratable salt, water and phosphonocarboxylic acid copolymers or phosphonopolyacrylic acid homopolymers binding agents forming a dimensionally stable composition. Preferred phosphonocarboxylic acid copolymers or phosphonopolyacrylic acid homopolymers have phosphono end groups and a molecular weight of between about 1,000 and about 30,000 grams/mole. The stability enhancement composition for use in a solid detergent and solid detergent compositions are preferably biodegradable and substantially free of phosphorus and NTA-free.

20 Claims, No Drawings

(56) References Cited

U.S. PATENT DOCUMENTS

| | | | |
|---|---|---|---|
| 5,925,610 A | 7/1999 | Austin et al. | |
| 6,020,297 A | 2/2000 | Austin et al. | |
| 6,025,322 A | 2/2000 | Boeckh et al. | |
| 6,075,093 A | 6/2000 | Rodrigues | |
| 6,113,655 A | 9/2000 | Tsunetsugu et al. | |
| 6,147,045 A | 11/2000 | Lappas | |
| 6,150,324 A | 11/2000 | Lentsch et al. | |
| 6,156,715 A | 12/2000 | Lentsch et al. | |
| 6,159,922 A | 12/2000 | Williams | |
| 6,172,020 B1 | 1/2001 | Binstock et al. | |
| 6,177,392 B1 | 1/2001 | Lentsch et al. | |
| 6,258,765 B1 | 7/2001 | Wei et al. | |
| 6,262,010 B1 | 7/2001 | Emery et al. | |
| 6,262,011 B1 | 7/2001 | Boeckh et al. | |
| 6,270,783 B1 | 8/2001 | Slavtcheff et al. | |
| 6,410,495 B1 | 6/2002 | Lentsch et al. | |
| 6,528,471 B1 * | 3/2003 | Del Duca et al. | 510/318 |
| 6,583,094 B1 | 6/2003 | Lentsch et al. | |
| 6,638,902 B2 | 10/2003 | Tarara et al. | |
| 6,653,266 B2 | 11/2003 | Wei et al. | |
| 6,660,707 B2 * | 12/2003 | Lentsch et al. | 510/445 |
| 6,831,054 B2 | 12/2004 | Lentsch et al. | |
| 6,835,706 B2 | 12/2004 | Lentsch et al. | |
| 6,956,019 B2 | 10/2005 | Lentsch et al. | |
| 7,049,746 B2 | 5/2006 | Mano et al. | |
| 7,087,569 B2 | 8/2006 | Lentsch et al. | |
| 7,186,677 B2 | 3/2007 | Rahse et al. | |
| 7,341,987 B2 | 3/2008 | Wei et al. | |
| 7,423,005 B2 | 9/2008 | Stolte et al. | |
| 7,442,679 B2 * | 10/2008 | Stolte et al. | 510/445 |
| 7,598,218 B2 | 10/2009 | Stolte et al. | |
| 7,759,300 B2 | 7/2010 | Besse et al. | |
| 7,763,576 B2 | 7/2010 | Tjelta et al. | |
| 7,888,303 B2 | 2/2011 | Tjelta et al. | |
| 7,893,012 B2 | 2/2011 | Tjelta et al. | |
| 7,923,427 B2 | 4/2011 | Stolte et al. | |
| 8,138,138 B2 | 3/2012 | Tjelta et al. | |
| 8,198,228 B2 | 6/2012 | Tjelta et al. | |
| 2002/0082178 A1 | 6/2002 | Besse et al. | |
| 2002/0177541 A1 | 11/2002 | Tarara et al. | |
| 2004/0102353 A1 | 5/2004 | Lentsch et al. | |
| 2005/0113278 A1 | 5/2005 | Stolte et al. | |
| 2005/0202995 A1 | 9/2005 | Waits et al. | |
| 2005/0202996 A1 | 9/2005 | Waits et al. | |
| 2005/0233920 A1 * | 10/2005 | Stolte et al. | 510/147 |
| 2006/0199754 A1 | 9/2006 | Brooker et al. | |
| 2006/0247144 A1 | 11/2006 | Geret | |
| 2006/0281654 A1 | 12/2006 | Brooker et al. | |
| 2007/0053849 A1 | 3/2007 | Doyle et al. | |
| 2007/0105742 A1 | 5/2007 | Scheibel et al. | |
| 2007/0225197 A1 | 9/2007 | Kruse et al. | |
| 2008/0269098 A1 | 10/2008 | Fregonese | |
| 2008/0274940 A1 | 11/2008 | Tjelta et al. | |
| 2008/0274942 A1 | 11/2008 | Tjelta et al. | |
| 2009/0011973 A1 | 1/2009 | Besse et al. | |
| 2009/0102085 A1 | 4/2009 | Stolte et al. | |
| 2009/0105114 A1 | 4/2009 | Stolte et al. | |
| 2009/0176687 A1 | 7/2009 | Tjelta et al. | |
| 2009/0176688 A1 | 7/2009 | Tjelta et al. | |
| 2009/0258810 A1 | 10/2009 | Song et al. | |
| 2009/0305934 A1 | 12/2009 | Creamer et al. | |
| 2010/0311634 A1 | 12/2010 | Besse et al. | |
| 2011/0118166 A1 | 5/2011 | Tjelta et al. | |
| 2011/0124546 A1 | 5/2011 | Tjelta et al. | |
| 2011/0124547 A1 | 5/2011 | Tjelta et al. | |
| 2011/0160117 A1 | 6/2011 | Stolte et al. | |

OTHER PUBLICATIONS

Acumer 3100 Terpolymer—The Anti-Scale Deposition for "Stressed" Cooling Water Conditions, Rohm and Haas Company, USA, 1999 (7 pages). Dec. 31, 1999.

Acumer 3100 Terpolymer for Control of Boiler Sludge, Rohm and Haas Company, USA, 1999 (12 pages). Dec. 31, 1999.

Acumer Water Treatment Polymers, "Acumer 2100 Copolymer" Rohm and Haas Company, USA, Dec. 2002 (4 pages). Dec. 31, 2002.

ACUSOL Product Line Description, updated Dec. 1, 2011, http://dowhpc.custhelp.com/app/answers/detail/a_id/12770/~/acusol-product-line-description, 2 pages, retrieved from the Internet on Jun. 13, 2012.

English Abstract of JP 2000199178 A, Applicant: Lion Corp (1 page). Jul. 18, 2000.

English Abstract of JP 2004204016 A, Applicant: Johnson Professional Co Ltd (1 page). Jul. 22, 2004.

International Search Report, completed and mailed on May 26, 2009; Application No. PCT/IB2008/055592 filed Dec. 30, 2008; Applicant: Ecolab Inc. et al. (7 pages).

International Search Report and Written Opinion of the International Searching Authority, completed and mailed on Jan. 30, 2009; Application No. PCT/IB2008/052274 filed Jun. 9, 2008; Applicant: Ecolab Inc. et al. (12 pages).

International Search Report and Written Opinion of the International Searching Authority, completed and mailed on Sep. 22, 2008; Application No. PCT/IB2008/050825 filed Mar. 6, 2008; Applicant: Ecolab Inc. et al. (9 pages).

International Search Report and Written Opinion of the International Searching Authority, completed and mailed on May 26, 2009; Application No. PCT/IB2008/055593 filed Dec. 30, 2008; Applicant: Ecolab Inc. et al. (6 pages).

* cited by examiner

SOLIDIFICATION MATRICES USING PHOSPHONOCARBOXYLIC ACID COPOLYMERS AND PHOSPHONOPOLYACRYLIC ACID HOMOPOLYMERS

CROSS REFERENCE TO RELATED APPLICATIONS

This application is a continuation of U.S. application Ser. No. 13/603,623 filed Sep. 5, 2012, which is a continuation-in-part of U.S. application Ser. No. 13/372,560, filed Feb. 14, 2012, now U.S. Pat. No. 8,389,464 issued on Mar. 5, 2013, which is a continuation of U.S. application Ser. No. 12/832,201, filed Jul. 8, 2010, now U.S. Pat. No. 8,138,138 issued on Mar. 20, 2012, which is a continuation-in-part of U.S. application Ser. No. 11/969,385 filed Jan. 4, 2008, now U.S. Pat. No. 7,763,576 issued on Jul. 27, 2010, each of which are incorporated herein in reference in their entirety.

FIELD OF THE INVENTION

The present invention relates generally to the field of solidification and solidification matrices. In particular, the invention relates to the development of dimensionally stable, solid detergent compositions containing a hydratable salt, water and phosphonocarboxylic acid copolymers or phosphonopolyacrylic acid homopolymers. The compositions according to the invention may be substantially free of phosphorus and NTA-free.

BACKGROUND OF THE INVENTION

The use of solidification technology and solid block detergents in institutional and industrial operations was pioneered in the SOLID POWER® brand technology claimed in Fernholz et al., U.S. Reissue Pat. Nos. 32,762 and 32,818. Additionally, sodium carbonate hydrate cast solid products using substantially hydrated sodium carbonate materials was disclosed in Heile et al., U.S. Pat. Nos. 4,595,520 and 4,680,134.

In more recent years, attention has been directed to producing highly effective detergent materials from less caustic materials such as soda ash, also known as sodium carbonate. Early work in developing the sodium carbonate based detergents found that sodium carbonate hydrate-based materials often swelled, (i.e., were dimensionally unstable) after solidification. Such swelling can interfere with packaging, dispensing, and use. The dimensional instability of the solid materials relates to the unstable nature of various hydrate forms prepared in manufacturing the sodium carbonate solid materials. Early products made with hydrated sodium carbonate typically comprised of anhydrous, a one mole hydrate, a seven mole hydrate, a ten mole hydrate or more mixtures thereof. However, after the product had been manufactured and stored at ambient temperatures, the hydration state of the initial product was found to shift between hydrate forms, e.g., one, seven, and ten mole hydrates, resulting in dimensional instability of the block chemicals. In these conventional solid form compositions, changes in water content and temperature lead to structural and dimensional change, which may lead to a failure of the solid form, resulting in problems such as the inability of the solid form to fit into dispensers for use.

Additionally, conventional solid alkaline detergents, particularly those intended for institutional and commercial use, generally require phosphates in their compositions. The phosphates typically serve multiple purposes in the compositions, for example, to control the rate of solidification, to remove and suspend soils, and as an effective hardness sequestrant. It was found, disclosed, and claimed in U.S. Pat. Nos. 6,258,765, 6,156,715, 6,150,324, and 6,177,392, that a solid block functional material could be made using a binding agent that includes a carbonate salt, an organic acetate, such as an aminocarboxylate, or phosphonate component and water. Due to ecological concerns, further work has recently been directed to replacing phosphorous-containing compounds in detergents. In addition, nitrilotriacetic acid (NTA)-containing aminocarboxylate components used in place of phosphorous-containing compounds in some instances as a binding agents and hardness sequestrants, are believed to be carcinogenic. As such, their use has also been curtailed.

An object of the invention is to identify binding agents capable of providing exceptional dimensional stability for a solid detergent composition.

Still further, an object of the invention is to develop such dimensionally stable, solid detergent composition that may be, substantially free of phosphorus and free of NTA.

BRIEF SUMMARY OF THE INVENTION

A stability enhancement agent for solid compositions is disclosed. The stability enhancement agent can be used for solid detergent compositions providing dimensional stability by controlling water movement within the solid composition or forming favorable interactions with other components in the composition.

An embodiment of the invention is a solid detergent composition is provided and comprises a phosphonocarboxylic acid copolymer or phosphonopolyacrylic acid homopolymer; a hydratable salt; and water, wherein the composition is substantially phosphorus-free and NTA-free.

In another embodiment of the invention solid detergent composition comprises: between about 0.1 wt-% and about 20 wt-% phosphonocarboxylic acid copolymer or phosphonopolyacrylic acid homopolymer, wherein the phosphonocarboxylic acid copolymer or phosphonopolyacrylic acid homopolymer polycarboxylic acid polymer has the following formula

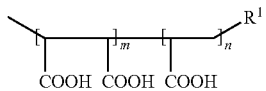

wherein m is 0 or larger and/or n is 2 or larger; between about 0 wt-% and about 50 wt-% water; between about 40 wt-% and about 90 wt-% sodium carbonate; and between about 0.5 wt-% and about 10 wt-% surfactant; wherein the solid detergent composition has less than about 0.5 wt-% phosphorus, and wherein the solid detergent composition is a hydrate solid, and if heated at a temperature of 122° F., the solid detergent composition is dimensionally stable and has a growth exponent of less than 3%.

Another embodiment of the invention is a method of forming a solid detergent composition comprising: combining a hydratable salt and at least one functional component to form a powder pre-mix; and mixing the powder pre-mix with a liquid pre-mix, the liquid pre-mix comprising phosphonocarboxylic acid copolymer or phosphonopolyacrylic acid homopolymer, wherein the phosphonocarboxylic acid copolymer or phosphonopolyacrylic acid homopolymer polycarboxylic acid polymer has the following formula

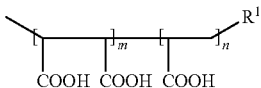

wherein R₁ is a phosphono end group, and wherein if heated at a temperature of 122° F., the solid detergent composition is dimensionally stable and has a growth exponent of less than 3%.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

The embodiments of this invention are not limited to particular solid detergent compositions as they may vary as understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities and refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like.

The terms "dimensional stability" and "dimensionally stable" as used herein, refer to a solid product having a growth exponent of less than about 3%. Although not intending to be limited according to a particular theory, the polyepoxysuccinic acid or metal salt thereof is believed to control the rate of water migration for the hydration of sodium carbonate. The polyepoxysuccinic acid or metal salts thereof may stabilize the solid composition by acting as a donor and/or acceptor of free water and controlling the rate of solidification.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

According to embodiments of the invention, the solid compositions overcome a need in the prior art by providing a dimensionally stable solid composition for use in any pressed, extruded or cast solid composition containing a hydratable salt and water. In particular, the composition would be useful for preparing a solid detergent composition that may be employed in any of a wide variety of situations where a dimensionally-stable, substantially phosphorous-free and nitrilotriacetic acid (NTA)-free solid product is desired. Substantially phosphorus-free means a solidification matrix having less than approximately 0.5 wt-%, more particularly, less than approximately 0.1 wt-%, and even more particularly less than approximately 0.01 wt-% phosphorous based on the total weight of the solidification matrix. NTA-free means a solidification matrix having less than approximately 0.5 wt-%, less than approximately 0.1 wt-%, and often less than approximately 0.01 wt-% NTA based on the total weight of the solidification matrix. When the solidification matrix is NTA-free, the solidification matrix and resulting solid detergent composition is also compatible with chlorine, which functions as an anti-redeposition and stain-removal agent. Accordingly, the embodiments of the present invention are particularly useful in cleaning applications where it is desired to use an environmentally friendly solid detergent.

Solidification Matrices

The solidification matrix of the present invention may be employed in any of a wide variety of situations in which a dimensionally stable solid product is desired. The solidification matrix is dimensionally stable and has an appropriate rate of solidification. In addition, the solidification matrix may be substantially-free of phosphorous and NTA-free, making the solidification matrix particularly useful in cleaning applications where it is desired to use an environmentally friendly detergent. Such applications include, but are not limited to: machine and manual warewashing, presoaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, industrial or household cleaners, and pest control agents. Methods suitable for preparing a solid detergent composition using the solidification matrix are also provided.

The solidification matrix generally includes a phosphonocarboxylic acid copolymer or phosphonopolyacrylic acid homopolymer, a hydratable salt, such as sodium carbonate (soda ash), and water for forming solid compositions. The solidification matrices may comprise, consist of and/or consist essentially of phosphonocarboxylic acid copolymer or phosphonopolyacrylic acid homopolymer, a hydratable salt and water.

Suitable component concentrations for the solidification matrix range from between approximately 0.1% and approximately 20% by weight phosphonocarboxylic acid copolymer or phosphonopolyacrylic acid homopolymer, between approximately 0% and approximately 50% by weight water, and between approximately 40% and approximately 95% by weight hydratable salt, such as sodium carbonate. Particularly suitable component concentrations for the solidification matrix range from between approximately 1% and approximately 15% by weight phosphonocarboxylic acid copolymer or phosphonopolyacrylic acid homopolymer, between approximately 0.1% and approximately 40% by weight water, and between approximately 50% and approximately 90% by weight sodium carbonate. More particularly suitable component concentrations for the solidification matrix range from between approximately 2.5% and approximately 10% by weight phosphonocarboxylic acid copolymer or phosphonopolyacrylic acid homopolymer, between approximately 1% and approximately 25% by weight water, and between approximately 60% and approximately 90% by weight sodium carbonate. Those skilled in the art will appreciate other suitable component concentration ranges for obtaining comparable properties of the solidification matrix.

The actual solidification mechanism of the solidification matrix occurs through ash hydration, or the interaction of the sodium carbonate with water. It is believed that the polycarboxylic acid polymer functions to control the kinetics and thermodynamics of the solidification process and provides a solidification matrix in which additional functional materials may be bound to form a functional solid composition. The phosphonocarboxylic acid copolymer or phosphonopolyacrylic acid homopolymer may stabilize the carbonate hydrates and the functional solid composition by acting as a donor and/or acceptor of free water. By controlling the rate of water migration for hydration of the ash, the phosphonocarboxylic acid copolymer or phosphonopolyacrylic acid homopolymer may control the rate of solidification to provide process and dimensional stability to the resulting product. The rate of solidification is significant because if the solidification matrix solidifies too quickly, the composition may solidify during mixing and stop processing. If the solidification matrix solidifies too slowly, valuable process time is lost.

The phosphonocarboxylic acid copolymer or phosphonopolyacrylic acid homopolymer also provides dimensional stability to the end product by ensuring that the solid product does not swell. If the solid product swells after solidification, various problems may occur, including but not limited to: decreased density, integrity, and appearance; and inability to dispense or package the solid product. Generally, a solid product is considered to have dimensional stability if the solid product has a growth exponent of less than about 3%. Growth exponent refers to the percent growth or swelling of a product over a period of time after solidification under normal transport/storage conditions. Because normal transport/storage conditions for detergent products often results in the detergent composition being subjected to an elevated temperature, the growth exponent of a solid detergent product may be determined by measuring one or more dimensions of the product prior to and after heating at between about 100° F. and 122° F. The measured dimension or dimensions depends on the shape of the solid product and the manner in which it swells. For tablets, the change in both diameter and height is generally measured and added together to determine the growth exponent. For capsules, just the diameter is normally measured.

Stability Enhancement Agent

The solidification matrices and solid detergent compositions according to the invention include a stability enhancement agent that controls water transfer within a solid composition and/or interacts with a detergent component in a way that achieves dimensional stability. The matrices and solid detergent compositions include phosphonocarboxylic acid copolymers or phosphonopolyacrylic acid homopolymers.

According to a preferred embodiment of the invention, the stability enhancement agent is a phosphonocarboxylic acid copolymer or phosphonopolyacrylic acid homopolymer having the following structure:

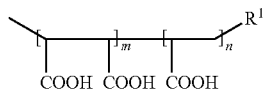

wherein $R_1$ is a phosphono end group. In certain aspects $R_1$ is $PO_2H_2$ or $PO_3H_2$. In additional aspects, m is an integer of 0 or larger, and n is an integer of 2 or larger. The value of the maleic group (m) of the phosphonocarboxylic acid copolymer or phosphonopolyacrylic acid homopolymer may be zero for the homopolymer. The value of the acrylic group (n) of the phosphonocarboxylic acid copolymer or phosphonopolyacrylic acid homopolymer may be at least 2. In an aspect of the invention for the copolymer, the sum of m+n is between about 5 to 180, wherein the molecular weight range of the polymer is between about 1,000 and 30,000.

As used herein, the term "phosphono end group" refers to a phosphono functional group according to the formula:

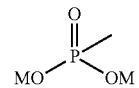

wherein each M is independently H or a cation, preferably both Ms are H.

Any reference to phosphonocarboxylic acid copolymers or phosphonopolyacrylic acid homopolymers throughout the description of the invention shall be understood to equally incorporate and include any phosphonocarboxylic acid copolymers or phosphonopolyacrylic acid homopolymers set forth by the above formula.

In some embodiments, polyacrylic phosphono end group polymers or acrylic-maleic phosphono end group copolymers have the following general formula (as depicted above): $H_2PO_3$-$(CH_2$—$CHCOOH)n(CHCOOH$—$CHCOOH)m$. In some aspects n is an integer greater than 0, m is an integer of 0 (for polyacrylic polymers) or greater (for acrylic-maleic copolymers). For polyacrylates, m is zero. In some aspects n and m are integers independently selected to give a molecular weight of the polymer of between about 500 and 200,000, preferably of between 500 and 100,000, and more preferably between 1,000 and 30,000.

In some embodiments, suitable polycarboxylates with phosphono end groups are copolymers of acrylic acid and maleic acid having a phosphono end group and homopolymers of acrylic acid having a phosphono end group. An example of a preferred modified polycarboxylate is a copolymer of acrylic acid and maleic acid with a phosphonic/phosphono end group according to the following general formula:

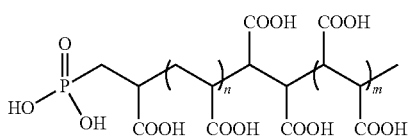

having variable molecular weights, wherein n is from about 10 mol % to 90 mol %, preferably from about 80 mol %, and wherein m is from about 10 mol % to 90 mol %, preferably from about 20 mol %.

Phosphonocarboxylic acid copolymers or phosphonopolyacrylic acid homopolymers are low-phosphorus, non-nitrogenous and environmentally friendly agents that may be synthesized as a combination of various chain-length phosphonocarboxylic acid copolymers or phosphonopolyacrylic acid homopolymers. For purposes of the present invention the phosphonocarboxylic acid copolymers or phosphonopolyacrylic acid homopolymers may have various chain length polymers and therefore varying molecular weights.

Examples of suitable commercially-available phosphonocarboxylic acid copolymers include Acusol 425N, available from Rohm & Haas. Acusol 425N is a low molecular weight (1900 MW) acrylic/maleic (ratio 80/20) copolymer having a phosphono end group (approximately 1.6-1.7 wt-% phosphorus) and has an activity of 50%. In some embodiments, a low molecular weight phosphonocarboxylic acid copolymer is preferred, such as polymers having molecular weight below about 2000 grams/mole.

Suitable polyacrylic phosphono end group polymers or acrylic-maleic phosphono end group copolymers for use herein are available from Rohm & Haas under the tradenames ACUSOL®. Examples of suitable commercially-available phosphonopolyacrylic acid homopolymers include Acusol470N, available from Rohm & Haas. Acusol470N is a low molecular weight (3700 MW) acrylic homopolymer with a phosphono end group (approximately 0.9-1.0 wt-% phosphorus) and has an activity of 40%. In some embodiments, a low molecular weight polyacrylic phosphono end group polymers or acrylic-maleic phosphono end group copolymers are preferred, such as polymers having molecular weight below about 4000 grams/mole.

In some aspects the phosphonocarboxylic acid copolymers or phosphonopolyacrylic acid homopolymers are neutralized.

Hydratable Salts

The solid detergent compositions according to the invention comprise at least one hydratable salt. In one embodiment the hydratable salt is sodium carbonate (soda ash or ash). The hydratable salt is provided in the ranges from between approximately 40% and approximately 90% by weight, preferably between approximately 40% and approximately 75% by weight, more preferably between approximately 50% and approximately 75% by weight hydratable salt, such as sodium carbonate. Those skilled in the art will appreciate other suitable component concentration ranges for obtaining comparable properties of the solidification matrix.

In further embodiments, the compositions can include a secondary hydratable salt for a solidification agent. For example, the solidification agent may be inorganic in nature and may also act optionally as a source of alkalinity. In certain embodiments, the secondary solidification agent may include, but are not limited to: alkali metal hydroxides, alkali metal phosphates, anhydrous sodium carbonate, anhydrous sodium sulfate, anhydrous sodium acetate, and other known hydratable compounds or combinations thereof. According to a preferred embodiment, the secondary hydratable salt comprises sodium carbonate, sodium metasilicate or combinations thereof. The amount of secondary solidifying agent necessary to achieve solidification depends upon several factors, including the exact solidifying agent employed, the amount of water in the composition, and the hydration capacity of the other detergent components. In certain embodiments, the secondary solidifying agent may also serve as an alkaline source.

Water

The solidification matrices and solid detergent compositions according to the invention may comprise water in amounts that vary depending upon techniques for processing the solid composition which may comprise a pressed, extruded and/or cast solid detergent composition.

Water may be independently added to the solidification matrix or may be provided in the solidification matrix as a result of its presence in an aqueous material that is added to the detergent composition. For example, materials added to the detergent composition may include water or may be prepared in an aqueous premix available for reaction with the solidification matrix component(s). Typically, water is introduced into the solidification matrix to provide the solidification matrix with a desired viscosity for processing prior to solidification and to provide a desired rate of solidification. The water may also be present as a processing aid and may be removed or become water of hydration. The water may thus be present in the form of aqueous solutions of the solidification matrix, or aqueous solutions of any of the other ingredients, and/or added aqueous medium as an aid in processing. In addition, it is expected that the aqueous medium may help in the solidification process when is desired to form the concentrate as a solid. The water may also be provided as deionized water or as softened water.

The amount of water in the resulting solid detergent composition will depend on whether the solid detergent composition is processed through forming techniques or casting (solidification occurring within a container) techniques. In general, when the components are processed by forming techniques, it is believed that the solid detergent composition can include a relatively smaller amount of water for solidification compared with the casting techniques. When preparing the solid detergent composition by forming techniques, water may be present in ranges of between about 0% and about 50% by weight, between about 0.1% and about 40% by weight, between about 1% and about 25% by weight, particularly between about 7% and about 20% by weight, and more particularly between about 8% and about 15% by weight. When preparing the solid detergent composition by casting techniques, water may be present in the ranges of between about 15% and about 50% by weight, particularly between about 20% and about 45% by weight, and more particularly between about 22% and about 40% by weight.

Additional Functional Materials

The components of the solidification matrix can be combined with various functional components used to form a solid detergent composition. In some embodiments, the solidification matrix including the phosphonocarboxylic acid copolymers or phosphonopolyacrylic acid homopolymers, water, and sodium carbonate make up a large amount, or even substantially all of the total weight of the detergent composition, for example, in embodiments having few or no additional functional materials disposed therein. In these embodiments, the component concentrations ranges provided above for the solidification matrix are representative of the ranges of those same components in the detergent composition.

The functional materials provide desired properties and functionalities to the solid detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional materials may be used. For example, many of the functional materials discussed below relate to materials used in cleaning and/or destaining applications. However, other embodiments may include functional materials for use in other applications.

Alkaline Source

The solid detergent composition can include an effective amount of one or more alkaline sources to enhance cleaning of a substrate and improve soil removal performance of the solid detergent composition. In general, it is expected that the composition will include the alkaline source in an amount of at least about 5% by weight, at least about 10% by weight, or at least about 15% by weight. In order to provide sufficient room for other components in the concentrate, the alkaline source can be provided in the concentrate in an amount of less than about 75% by weight, less than about 60% by weight, less than about 40% by weight, less than about 30% by weight, or less than about 20% by weight. The alkalinity source may constitute between about 0.1% and about 90% by weight, between about 0.5% and about 80% by weight, and between about 1% and about 60% by weight of the total weight of the solid detergent composition.

An effective amount of one or more alkaline sources should be considered as an amount that provides a use composition having a pH of at least about 8. When the use composition has a pH of between about 8 and about 10, it can be considered mildly alkaline, and when the pH is greater than about 12, the use composition can be considered caustic.

Examples of suitable alkaline sources of the solid detergent composition include, but are not limited to an alkali metal carbonate and an alkali metal hydroxide. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, lithium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution. It is preferred that the alkali metal hydroxide is added in the form of an aqueous solution, particularly a 50% by weight hydroxide solution, to reduce the amount of heat generated in the composition due to hydration of the solid alkali material.

In addition to the first alkalinity source, the solid detergent composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present solid detergent compositions.

Surfactants

The solid detergent composition can include at least one cleaning agent comprising a surfactant or surfactant system. A variety of surfactants can be used in a solid detergent composition, including, but not limited to: anionic, nonionic, cationic, amphoteric and zwitterionic surfactants. Surfactants are an optional component of the solid detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912, which is herein incorporated by reference in its entirety. When the solid detergent composition includes a cleaning agent, the cleaning agent is provided in an amount effective to provide a desired level of cleaning. The solid detergent composition, when provided as a concentrate, can include the cleaning agent in a range of about 0.05% to about 20% by weight, about 0.5% to about 10% by weight, about 1% to about 10% by weight, about 1.5% to about 10% by weight, and about 2% to about 8% by weight. Additional exemplary ranges of surfactant in a concentrate include about 0.5% to about 8% by weight, and about 1% to about 5% by weight.

Examples of anionic surfactants useful in the solid detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in the solid detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va.

Examples of cationic surfactants that can be used in the solid detergent composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in the solid detergent composition include, but are not limited to: betaines, imidazolines, and propionates.

Because the solid detergent composition is intended to be used in an automatic dishwashing or warewashing machine, the surfactants selected, if any surfactant is used, can be those that provide an acceptable level of foaming when used inside a dishwashing or warewashing machine. Solid detergent compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

Builders or Water Conditioners

The solid detergent composition can include one or more building agents, also called chelating or sequestering agents (e.g., builders), including, but not limited to: a condensed phosphate, a phosphonate, an aminocarboxylic acid, or a polyacrylate. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the solid detergent is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the composition by fixing the free water present in the composition as water of hydration.

Examples of phosphonates include, but are not limited to: 2-phosphonobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)} N_3Na_xO_{15}P_5$ (x=7); hexamethylenediamine(tetramethylenephosphonate), potassium salt, $C_{10}H_{(28-x)}N_2K_xO_{12}P_4$ (x=6); bis(hexamethylene)triamine (pentamethylenephosphonic acid), $(HO_2)POCH_2N[(CH_2)_2N[CH_2PO(OH)_2]_2]_2$; and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the composition is phosphorous-free.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the composition is free of aminocarboxylates.

The solid detergent compositions can contain a non-phosphorus based builder. Although various components may include trace amounts of phosphorous, a composition that is considered free of phosphorous generally does not include phosphate or phosphonate builder or chelating components as an intentionally added component. Carboxylates such as citrate, tartrate or gluconate are suitable. Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($-CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers Hardening Agents The solid detergent compositions can also include a hardening agent in addition to, or in the form of, the builder. A hardening agent is a compound or system of compounds, organic or inorganic, which significantly contributes to the uniform solidification of the composition. Preferably, the hardening agents are compatible with the cleaning agent and other active ingredients of the composition and are capable of providing an effective amount of hardness and/or aqueous solubility to the processed composition. The hardening agents should also be capable of forming a homogeneous matrix with the cleaning agent and other ingredients when mixed and solidified to provide a uniform dissolution of the cleaning agent from the solid detergent composition during use.

The amount of hardening agent included in the solid detergent composition will vary according to factors including, but not limited to: the type of solid detergent composition being prepared, the ingredients of the solid detergent composition, the intended use of the composition, the quantity of dispensing solution applied to the solid composition over time during use, the temperature of the dispensing solution, the hardness of the dispensing solution, the physical size of the solid detergent composition, the concentration of the other ingredients, and the concentration of the cleaning agent in the composition. It is preferred that the amount of the hardening agent included in the solid detergent composition is effective to combine with the cleaning agent and other ingredients of the composition to form a homogeneous mixture under continuous mixing conditions and a temperature at or below the melting temperature of the hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately 1 minute to approximately 3 hours, particularly approximately 2 minutes to approximately 2 hours, and particularly approximately 5 minutes to approximately 1 hour. A minimal amount of heat from an external source may be applied to the mixture to facilitate processing of the mixture. It is preferred that the amount of the hardening agent included in the solid detergent composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A preferred organic hardening agent is a polyethylene glycol (PEG) compound. The solidification rate of solid detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, particularly approximately 30 to approximately 1700. Typically, the polyethylene glycol is a solid in the form of a free-flowing powder or flakes, having a molecular weight of approximately 1,000 to approximately 100,000, particularly having a molecular weight of at least approximately 1,450 to approximately 20,000, more particularly between approximately 1,450 to approximately 8,000. The polyethylene glycol is present at a concentration of from approximately 1% to 75% by weight and particularly approximately 3% to approximately 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Preferred inorganic hardening agents are hydratable inorganic salts, including, but not limited to: sulfates and bicarbonates. The inorganic hardening agents are present at concentrations of up to approximately 50% by weight, particularly approximately 5% to approximately 25% by weight, and more particularly approximately 5% to approximately 15% by weight.

Urea particles can also be employed as hardeners in the solid detergent compositions. The solidification rate of the compositions will vary, at least in part, to factors including, but not limited to: the amount, the particle size, and the shape of the urea added to the composition. For example, a particulate form of urea can be combined with a cleaning agent and other ingredients, and preferably a minor but effective amount of water. The amount and particle size of the urea is effective to combine with the cleaning agent and other ingredients to form a homogeneous mixture without the application of heat from an external source to melt the urea and other ingredients to a molten stage. It is preferred that the amount of urea included in the solid detergent composition is effective to provide a desired hardness and desired rate of solubility of the composition when placed in an aqueous medium to achieve a desired rate of dispensing the cleaning agent from the solidified composition during use. In some embodiments, the composition includes between approximately 5% to approximately 90% by weight urea, particularly between approximately 8% and approximately 40% by weight urea, and more particularly between approximately 10% and approximately 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Bleaching Agents

Bleaching agents suitable for use in the solid detergent composition for lightening or whitening a substrate include bleaching compounds capable of liberating an active halogen species, such as $Cl_2$, $Br_2$, $—OCl^-$ and/or $—OBr^-$, under conditions typically encountered during the cleansing process. Suitable bleaching agents for use in the solid detergent compositions include, but are not limited to: chlorine-containing compounds such as chlorines, hypochlorites, or chloramines. Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the disclosure of which is incorporated by reference herein in its entirety). A bleaching agent may also be a peroxygen or active oxygen source such as hydrogen peroxide, perborates, sodium carbonate peroxyhydrate, potassium permonosulfate, and sodium perborate mono and tetrahydrate, with and without activators such as tetraacetylethylene diamine. When the concentrate includes a bleaching agent, it can be included in an amount of between approximately 0.1% and approximately 60% by weight, between approximately 1% and approximately 20% by weight, between approximately 3% and approximately 8% by weight, and between approximately 3% and approximately 6% by weight.

Fillers

The solid detergent composition can include an effective amount of detergent fillers which do not perform as a cleaning agent per se, but cooperates with the cleaning agent to enhance the overall cleaning capacity of the composition. Examples of detergent fillers suitable for use in the present cleaning compositions include, but are not limited to: sodium sulfate and sodium chloride. When the concentrate includes a detergent filler, it can be included in an amount up to approximately 50% by weight, between approximately 1% and approximately 30% by weight, or between approximately 1.5% and approximately 25% by weight.

Defoaming Agents

A defoaming agent for reducing the stability of foam may also be included in the warewashing composition. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. Nos. 3,048,548, 3,334,147, and 3,442,242, the disclosures of which are incorporated herein by reference. When the concentrate includes a defoaming agent, the defoaming agent can be provided in an amount of between approximately 0.0001% and approximately 10% by weight, between approximately 0.001% and approximately 5% by weight, or between approximately 0.01% and approximately 1.0% by weight.

Anti-Redeposition Agents

The solid detergent composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride copolymers, cellulosic derivatives such as hydroxyethyl cellulose, hydroxypropyl cellulose and carboxymethyl cellulose. When the concentrate includes an anti-redeposition agent, the anti-redeposition agent can be included in an amount of between approximately 0.5% and approximately 10% by weight, and between approximately 1% and approximately 5% by weight.

Stabilizing Agents

The solid detergent composition may also include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, between approximately 0.5% and approximately 15% by weight, and between approximately 2% and approximately 10% by weight.

Dispersants

The solid detergent composition may also include dispersants. Examples of suitable dispersants that can be used in the solid detergent composition include, but are not limited to: maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be up to approximately 20% by weight, between approximately 0.5% and approximately 15% by weight, and between approximately 2% and approximately 9% by weight.

Enzymes

Enzymes that can be included in the solid detergent composition include those enzymes that aid in the removal of starch and/or protein stains. Exemplary types of enzymes include, but are not limited to: proteases, alpha-amylases, and mixtures thereof. Exemplary proteases that can be used include, but are not limited to: those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme, but when the concentrate includes an enzyme, it can be included in an amount that provides the desired enzymatic activity when the solid detergent composition is provided as a use composition. Exemplary ranges of the enzyme in the concentrate include up to approximately 15% by weight, between approximately 0.5% to approximately 10% by weight, and between approximately 1% to approximately 5% by weight.

Glass and Metal Corrosion Inhibitors

The solid detergent composition can include a metal corrosion inhibitor in an amount up to approximately 50% by weight, between approximately 1% and approximately 40% by weight, or between approximately 3% and approximately 30% by weight. The corrosion inhibitor is included in the solid detergent composition in an amount sufficient to provide a use solution that exhibits a rate of corrosion and/or etching of glass that is less than the rate of corrosion and/or etching of glass for an otherwise identical use solution except for the absence of the corrosion inhibitor. It is expected that the use solution will include at least approximately 6 parts per million (ppm) of the corrosion inhibitor to provide desired corrosion inhibition properties. It is expected that larger amounts of corrosion inhibitor can be used in the use solution without deleterious effects. It is expected that at a certain point, the additive effect of increased corrosion and/or etching resistance with increasing corrosion inhibitor concentration will be lost, and additional corrosion inhibitor will simply increase the cost of using the solid detergent composition. The use solution can include between approximately 6 ppm and approximately 300 ppm of the corrosion inhibitor, and between approximately 20 ppm and approximately 200 ppm of the corrosion inhibitor. Examples of suitable corrosion inhibitors include, but are not limited to: a combination of a source of aluminum ion and a source of zinc ion, as well as an alkaline metal silicate or hydrate thereof.

The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof. Exemplary sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

An effective amount of an alkaline metal silicate or hydrate thereof can be employed in the compositions and processes of the invention to form a stable solid detergent composition having metal protecting capacity. The silicates employed in the compositions of the invention are those that have conventionally been used in solid detergent formulations. For example, typical alkali metal silicates are those powdered, particulate or granular silicates which are either anhydrous or preferably which contain water of hydration (approximately 5% to approximately 25% by weight, particularly approximately 15% to approximately 20% by weight water of hydration). These silicates are preferably sodium silicates and have a $Na_2O:SiO_2$ ratio of approximately 1:1 to approximately 1:5, respectively, and typically contain available water in the amount of from approximately 5% to approximately 25% by weight. In general, the silicates have a $Na_2O:SiO_2$ ratio of approximately 1:1 to approximately 1:3.75, particularly approximately 1:1.5 to approximately 1:3.75 and most particularly approximately 1:1.5 to approximately 1:2.5. A silicate with a $Na_2O:SiO_2$ ratio of approximately 1:2 and approximately 16% to approximately 22% by weight water of hydration, is most preferred. For example, such silicates are available in powder form as GD Silicate and in granular form as Britesil H-20, available from PQ Corporation, Valley Forge, Pa. These ratios may be obtained with single silicate compositions or combinations of silicates which upon combination result in the preferred ratio. The hydrated silicates at preferred ratios, a $Na_2O:SiO_2$ ratio of approximately 1:1.5 to approximately 1:2.5, have been found to provide the optimum metal protection and rapidly form a solid detergent. Hydrated silicates are preferred.

Silicates can be included in the solid detergent composition to provide for metal protection but are additionally known to provide alkalinity and additionally function as anti-redeposition agents. Exemplary silicates include, but are not limited to: sodium silicate and potassium silicate. The solid detergent composition can be provided without silicates, but when silicates are included, they can be included in amounts that provide for desired metal protection. The concentrate can include silicates in amounts of at least approximately 1% by weight, at least approximately 5% by weight, at least approximately 10% by weight, and at least approximately 15% by weight. In addition, in order to provide sufficient room for other components in the concentrate, the silicate component can be provided at a level of less than approximately 35% by weight, less than approximately 25% by weight, less than approximately 20% by weight, and less than approximately 15% by weight.

Fragrances and Dyes

Various dyes, odorants including perfumes, and other aesthetic enhancing agents can also be included in the composition. Suitable dyes that may be included to alter the appearance of the composition, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Fragrances or perfumes that may be included in the compositions include, but are not limited to: terpenoids such as citronellol, aldehydes such as amyl cinnamaldehyde, a jasmine such as C1S-jasmine or jasmal, and vanillin.

Thickeners

The solid detergent compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, particularly five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the solid detergent compositions further include polyvinyl alcohol thickeners, such as, fully hydrolyzed (greater than 98.5 mol acetate replaced with the —OH function).

An example of a particularly suitable polysaccharide includes, but is not limited to, xanthans. Such xanthan polymers are preferred due to their high water solubility, and great thickening power. Xanthan is an extracellular polysaccharide of xanthomonas campestras. Xanthan may be made by fermentation based on corn sugar or other corn sweetener by-products. Xanthan comprises a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, Calif. Known organic crosslinking agents can also be used. A preferred crosslinked xanthan is KELZAN® AR, which provides a pseudo plastic use solution that can produce large particle size mist or aerosol when sprayed.

Methods for Making a Solid Detergent Composition

Without being limited to a particular theory of the invention, the actual mechanism for solidification for compositions according to the invention occurs through ash hydration. Additional methods of solidification matrix using polymers are described in U.S. Pat. No. 7,763,576, the disclosure of which is incorporated by reference herein its entirety.

The phosphonocarboxylic acid copolymers or phosphonopolyacrylic acid homopolymers is combined with water prior to incorporation into the detergent composition and can be provided as a solid hydrate or as a solid salt that is solvated in an aqueous solution, e.g., in a liquid premix. However, the phosphonocarboxylic acid copolymers or phosphonopolyacrylic acid homopolymers should be in a water matrix when added to the detergent composition for the detergent composition to effectively solidify. In general, an effective amount of phosphonocarboxylic acid copolymers or phosphonopolyacrylic acid homopolymers is considered an amount that effectively controls the kinetics and thermodynamics of the solidification system by controlling the rate and movement of water.

The solid detergent composition according to the invention can be created by combining a phosphonocarboxylic acid copolymer or phosphonopolyacrylic acid homopolymer, sodium carbonate, water, and any additional functional components and allowing the components to interact and solidify. Those skilled in the art will appreciate suitable component concentration ranges for obtaining desired properties of the solidification matrix as disclosed herein.

In some embodiments, the relative amounts of water and phosphonocarboxylic acid copolymer or phosphonopolyacrylic acid homopolymer are controlled within a composition. The solidification matrix and additional functional components harden into solid form due to the chemical reaction of the sodium carbonate with the water. As the solidification matrix solidifies, a binder composition can form to bind and solidify the components. At least a portion of the ingredients associate to form the binder while the balance of the ingredients forms the remainder of the solid composition. The solidification process may last from a few minutes to about six hours, depending on factors including, but not limited to: the size of the formed or cast composition, the ingredients of the composition, and the temperature of the composition.

According to embodiments of the invention, the solid detergent composition is understood to mean a hardened composition that will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and preferably up to approximately 122° F.

Solid detergent compositions formed using the solidification matrix is produced using a batch or continuous mixing system. In an exemplary embodiment, a single- or twin-screw extruder is used to combine and mix one or more cleaning agents at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

Specifically, in a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

Methods of Use

The embodiments of the present invention are particularly useful in cleaning applications. Beneficially, the use of the phosphonocarboxylic acid copolymers or phosphonopolyacrylic acid homopolymers according to the invention for providing dimensional stability further provide cleaning efficacy. For example, the methods of cleaning employing the phosphonocarboxylic acid copolymers or phosphonopolyacrylic acid homopolymers provide additional benefits of reduced scale accumulation.

According to the invention the solid detergent compositions can be utilized for any pressed, extruded and/or cast solid detergent compositions. Still further, according to the invention the composition can be utilized for any molded or formed solid pellet, block, tablet, powder, granule, flake or the formed solid can thereafter be ground or formed into a powder, granule, or flake.

In addition, according to the invention the solid composition can further be utilized for any solid compositions containing a hydratable salt and water, including but not limited to uses related to: machine and manual warewashing, pre-soaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, industrial or household cleaners, and pest control agents.

The employed solid detergent composition may take forms including, but not limited to: a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the solidification matrix have a weight of approximately 100 grams or greater, and solid block detergents formed by the solidification matrix have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

In certain embodiments, the solid detergent composition is provided in the form of a unit dose. A unit dose refers to a solid detergent composition unit sized so that the entire unit is used during a single washing cycle. When the solid detergent composition is provided as a unit dose, it is typically provided as a cast solid, an extruded pellet, or a tablet having a size of between approximately 1 gram and approximately 50 grams.

In other embodiments, the solid detergent composition is provided in the form of a multiple-use solid, such as a block or a plurality of pellets, and can be repeatedly used to generate aqueous detergent compositions for multiple washing cycles. In certain embodiments, the solid detergent composition is provided as a cast solid, an extruded block, or a tablet having a mass of between approximately 5 grams and approximately 10 kilograms. In certain embodiments, a multiple-use form of the solid detergent composition has a mass between approximately 1 kilogram and approximately 10 kilograms. In further embodiments, a multiple-use form of the solid detergent composition has a mass of between approximately 5 kilograms and about approximately 8 kilograms. In other embodiments, a multiple-use form of the solid detergent composition has a mass of between about approximately 5 grams and approximately 1 kilogram, or between approximately 5 grams and approximately 500 grams.

Although the detergent composition is discussed as being formed into a solid product, the detergent composition may also be provided in the form of a paste. When the concentrate is provided in the form of a paste, enough water is added to the detergent composition such that complete solidification of the detergent composition is precluded. In addition, dispersants and other components may be incorporated into the detergent composition in order to maintain a desired distribution of components.

In an aspect of the invention, use solutions of the solid detergent compositions have a pH between about 8 to about 12.5, preferably from about 9 to about 11.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Solid compositions of a stability-enhanced detergent containing a phosphonocarboxylic acid were compared to a control as shown below in Table 1. The experimental formula according to the invention was calculated to have the same ash to water ratio as the Control formula at the time of the experiment. The experimental formula according to the invention did not add additional water due to the amount of free water in the formula (due to the addition of the polymer).

TABLE 1

| Pressed Solid Composition | | |
| --- | --- | --- |
| Description | Control | EXP1 |
| Dense Ash | 82.3 | 82.3 |
| Dequest 2010 (60%) | 1 | 1 |
| KOH (45%) | 8.89 | 5.45 |
| Water | 3.02 | 0 |
| Dehypon LS-36 | 3.68 | 3.68 |
| Pluronic 25-R-2 | 1.11 | 1.11 |
| Acusol 425N (50%) | 0 | 10 |
| Total | 100 | 103.54 |

Water and the phosphonocarboxylic acid polymer (commercially available as Acusol 425N (50% active solution of an acrylic/maleic copolymer with a phosphono end group), molecular weight 1900 grams/mole, were mixed together thoroughly. In a separate container the dense ash was mixed together thoroughly. The liquid premix was gradually added to the dry components while stirring until homogeneous. 50 grams of detergent was immediately poured into a circular pressing die and pressed at 1000 psi for 20 seconds. The initial height and diameter of each tablet was measured one hour after the tablets were pressed. These values were used as the initial height and diameter for the stability experiments described below.

Tablets were placed in an oven at 100° F. and 122° F. (two tablets for each composition tested at each given temperature). Experiments were performed with two tablets for each temperature (4 total tablets for each composition). Additional measurements were recorded after 1 and 2 weeks. The percent growth in height and diameter was averaged separately for each tablet and reported with standard deviations as shown in Tables 2 and 3. Less than 3% growth in either height or diameter under the most stringent conditions (122° F.) indicated effective control of the binding agent on the dimensional stability of the composition.

TABLE 2

| | | | Stability Results After 1 Week | | | | |
| --- | --- | --- | --- | --- | --- | --- | --- |
| | Temp (F.) | % Growth (Diameter) | % Growth (Height) | Avg. % Growth (Diameter) | Stand. Dev. on (% Growth Diameter) | Average % Growth (Height) | Stand. Dev. on (% Growth Height) |
| Control | 100° | 1.91 | 0.54 | 0.88 | 0.445 | 0.65 | 0.148 |
| Control | 100° | 0.56 | 0.75 | | | | |
| Control | 122° | 20.56 | 29.54 | 23.50 | 4.158 | 28.15 | 1.973 |
| Control | 122° | 26.44 | 26.75 | | | | |
| EXP1 | 100° | 0.45 | 1.15 | 0.93 | 0.672 | 1.7 | 0.771 |
| EXP1 | 100° | 1.40 | 2.24 | | | | |
| EXP1 | 122° | 0.69 | 1.45 | 0.57 | 0.170 | 0.92 | 0.750 |
| EXP1 | 122° | 0.45 | 0.39 | | | | |

TABLE 3

| | | | Stability Results After 2 Weeks | | | | |
| --- | --- | --- | --- | --- | --- | --- | --- |
| | Temp (F.) | % Growth (Diameter) | % Growth (Height) | Avg. % Growth (Diameter) | Stand. Dev. on (% Growth Diameter) | Average % Growth (Height) | Stand. Dev. on (% Growth Height) |
| Control | 100° | 10.64 | 0.54 | 9.93 | 1.011 | 6.15 | 7.927 |
| Control | 100° | 9.21 | 11.75 | | | | |
| Control | 122° | 33.36 | 29.54 | 30.71 | 3.748 | 27.88 | 2.355 |
| Control | 122° | 28.06 | 26.21 | | | | |
| EXP1 | 100° | 0.16 | −0.22 | 0.28 | 0.170 | 0.14 | 0.509 |
| EXP1 | 100° | 0.40 | 0.50 | | | | |
| EXP1 | 122° | 0.89 | 0.00 | 0.81 | 0.120 | 0.50 | 0.700 |
| EXP1 | 122° | 0.72 | 0.99 | | | | |

The compositions must swell <3% for the binding agent to be considered effective for controlling the dimensional stability of the composition. Under the most extreme conditions (122° F.), the control swelled an average of 29.3% while the composition containing the Acusol 425N stability enhancement agent swelled only 0.66%. This demonstrates the effectiveness of phosphonocarboxylic acids as a binding agent for controlling dimensional stability of compositions containing sodium carbonate and water.

Example 2

Solid compositions of a stability-enhanced detergent containing a phosphonopolyacrylic acid were compared to a control (having the same ash to water ratio as the phosphonopolyacrylic acid composition) as shown below in Table 4. As set forth in Example 1, the experimental formula according to the invention was calculated to have the same ash to water ratio as the Control formula at the time of the experiment. The experimental formula according to the invention did not add additional water due to the amount of free water in the formula (due to the addition of the polymer).

TABLE 4

Pressed Solid Composition

| Description | Control | EXP 2 |
|---|---|---|
| Dense Ash | 82.3 | 82.5 |
| Dequest 2010 (60%) | 1 | 1 |
| KOH (45%) | 8.89 | 0.95 |
| Water | 3.02 | 0 |
| Dehypon LS-36 | 3.68 | 3.68 |
| Pluronic 25-R-2 | 1.11 | 1.11 |
| Acusol 470N (40%) | 0 | 12.5 |
| Total | 100 | 101.74 |

Water and the phosphonopolyacrylic acid homopolymer (commercially available as Acusol 470N (40% active solution of an acrylic homopolymer with a phosphono end group), molecular weight 3700 grams/mole, were mixed together thoroughly. The methods of Example 1 were employed for evaluating the stability of the pressed tablets. The results are shown in Tables 5 and 6.

TABLE 5

Stability Results After 1 Week

| | Temp (F.) | % Growth (Diameter) | % Growth (Height) | Avg. % Growth (Diameter) | Stand. Dev. on (% Growth Diameter) | Average % Growth (Height) | Stand. Dev. on (% Growth Height) |
|---|---|---|---|---|---|---|---|
| Control | 100° | 1.19 | 0.54 | 0.88 | 0.445 | 0.65 | 0.148 |
| Control | 100° | 0.56 | 0.75 | | | | |
| Control | 122° | 20.56 | 29.54 | 23.50 | 4.158 | 28.15 | 1.973 |
| Control | 122° | 26.44 | 26.75 | | | | |
| EXP 2 | 100° | 0.20 | −0.22 | 0.68 | 0.679 | −0.34 | 0.163 |
| EXP 2 | 100° | 1.16 | −0.45 | | | | |
| EXP 2 | 122° | 0.83 | 0.00 | 0.66 | 0.240 | 0.19 | 0.262 |
| EXP 2 | 122° | 0.49 | 0.37 | | | | |

TABLE 6

Stability Results After 2 Weeks

| | Temp (F.) | % Growth (Diameter) | % Growth (Height) | Avg. % Growth (Diameter) | Stand. Dev. on (% Growth Diameter) | Average % Growth (Height) | Stand. Dev. on (% Growth Height) |
|---|---|---|---|---|---|---|---|
| Control | 100° | 10.64 | 0.54 | 9.93 | 1.011 | 6.15 | 7.927 |
| Control | 100° | 9.21 | 11.75 | | | | |
| Control | 122° | 33.36 | 29.54 | 30.71 | 3.748 | 27.88 | 2.355 |
| Control | 122° | 28.06 | 26.21 | | | | |
| EXP1 | 100° | 0.16 | −0.22 | 0.36 | 0.283 | 0.31 | 0.750 |
| EXP1 | 100° | 0.56 | 0.84 | | | | |
| EXP1 | 122° | 0.89 | 0.00 | 0.74 | 0.219 | 0.08 | 0.113 |
| EXP1 | 122° | 0.58 | 0.16 | | | | |

The compositions must swell <3% for the binding agent to be considered effective for controlling the dimensional stability of the composition. Under the most extreme conditions (122° F.), the control swelled an average of 29.3% while the composition containing the Acusol 470N stability enhancement agent swelled only 0.41%. This demonstrates the effectiveness of phosphonocarboxylic acids as a binding agent for controlling dimensional stability of compositions containing sodium carbonate and water.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A solid detergent composition comprising:
   between about 0.1 wt-% and about 20 wt-% of the composition a phosphonocarboxylic acid copolymer or phosphonopolyacrylic acid homopolymer;
   between about 50 wt-% and about 90 wt-% of a hydratable salt comprising sodium carbonate; and
   water,
   wherein the composition is substantially phosphorus-free and NTA-free and does not contain MGDA; wherein the pH of a use solution of the solid detergent composition is greater than 9; wherein the solid detergent composition is dimensionally stable and has a growth exponent of less than 3% if heated at a temperature of 122° F.

2. The composition of claim 1, wherein the phosphonocarboxylic acid copolymer or phosphonopolyacrylic acid homopolymer has the following general formula

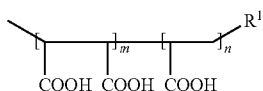

wherein $R_1$ is a phosphono end group.

3. The composition of claim 1, wherein $R_1$ is $PO_2H_2$ or $PO_3H_2$.

4. The composition of claim 1, wherein the hydratable salt further comprises an alkali metal hydroxide.

5. The composition of claim 1, wherein the phosphonocarboxylic acid copolymer or phosphonopolyacrylic acid homopolymer has a molecular weight of between about 1,000-30,000 g/mol.

6. The composition of claim 1, wherein m is 0 or larger and/or n is 2 or larger.

7. The composition of claim 4, wherein the alkali metal hydroxide comprises potassium hydroxide.

8. The composition of claim 1, wherein the phosphonocarboxylic acid copolymer or phosphonopolyacrylic acid homopolymer constitutes between about 1 wt-% and about 15 wt-% of the composition, and wherein the hydratable salt constitutes between about 50 wt-% and about 75 wt-% of the composition.

9. The composition of claim 1, further comprising at least one functional ingredient selected from the group consisting of an alkalinity source, detergent builder, surfactant and combinations thereof.

10. The composition of claim 1 wherein the composition is a cast, pressed, or extruded solid.

11. A solid detergent composition comprising:
    between about 1 wt-% and about 15 wt-% phosphonocarboxylic acid copolymer or phosphonopolyacrylic acid homopolymer, wherein the phosphonocarboxylic acid copolymer or phosphonopolyacrylic acid homopolymer polycarboxylic acid polymer has the following formula

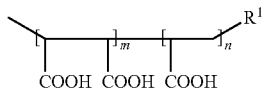

wherein m is 0 or larger and/or n is 2 or larger;
    between about 0.1 wt-% and about 50 wt-% water;
    between about 50 wt-% and about 90 wt-% sodium carbonate; and
    between about 0.5 wt-% and about 10 wt-% surfactant;
    wherein the solid detergent composition has less than about 0.5 wt-% phosphorus, wherein the pH of a use solution of the solid detergent composition is greater than 9, wherein the solid detergent composition is NTA-free and does not contain MGDA, and wherein the solid detergent composition is dimensionally stable and has a growth exponent of less than 3% if heated at a temperature of 122° F.

12. The composition of claim 11, wherein $R_1$ is a phosphono end group.

13. The composition of claim 12, wherein $R_1$ is $PO_2H_2$ or $PO_3H_2$.

14. The composition of claim 11, wherein the phosphonocarboxylic acid copolymer or phosphonopolyacrylic acid homopolymer has a molecular weight of between about 1,000-30,000 g/mol.

15. The composition of claim 11, wherein the sum of m and n is between 5 and 180.

16. The composition of claim 11 further comprising at least one functional ingredient.

17. The composition of claim 16 wherein the functional ingredient is selected from the group consisting of: chelating agents, sequestering agents, inorganic detergents, organic detergents, alkaline sources, builders, water conditioners, surfactants, rinse aids, hardening agents, bleaching agents, sanitizers, activators, detergent builders, fillers, defoaming agents, anti-redeposition agents, optical brighteners, dyes, odorants, stabilizing agents, dispersants, enzymes, corrosion inhibitors, thickeners and solubility modifiers.

18. A method of forming a solid detergent composition, comprising:
    combining a hydratable salt comprising sodium carbonate and at least one functional component to form a powder pre-mix; and
    mixing the powder pre-mix with a liquid pre-mix to form a solid detergent composition, the liquid pre-mix comprising phosphonocarboxylic acid copolymer or phosphonopolyacrylic acid homopolymer and water, wherein the phosphonocarboxylic acid copolymer or phosphonopolyacrylic acid homopolymer polycarboxylic acid polymer has the following formula

wherein $R_1$ is a phosphono end group, wherein the solid detergent composition comprises between about 50 wt-% and about 90 wt-% of the hydratable salt and between about 0.1 wt-% and about 20 wt-% of the phosphonocarboxylic acid copolymer or phosphonopolyacrylic acid homopolymer, wherein the pH of a use solution of the solid detergent composition is greater than 9, wherein the solid detergent composition is NTA-free and does not contain MGDA, and wherein if heated at a temperature of 122° F., the solid detergent composition is dimensionally stable and has a growth exponent of less than 3%.

19. The method of claim 18, wherein the hydratable salt further comprises an alkali metal hydroxide.

20. The method of claim 18 wherein the detergent composition is a cast, pressed, or extruded solid.

* * * * *